(12) United States Patent
Dibuduo

(10) Patent No.: US 6,980,781 B2
(45) Date of Patent: Dec. 27, 2005

(54) DYNAMIC SECOND STAGE FILTERING FOR PILOT ENERGY STRENGTH MEASUREMENTS

(75) Inventor: Marcus Dibuduo, Oceanside, CA (US)

(73) Assignee: DENSO Corporation, Kariya (JP)

( * ) Notice: Subject to any disclaimer, the term of this patent is extended or adjusted under 35 U.S.C. 154(b) by 482 days.

(21) Appl. No.: 10/074,075

(22) Filed: Feb. 11, 2002

(65) Prior Publication Data
US 2002/0142742 A1 Oct. 3, 2002

Related U.S. Application Data

(60) Provisional application No. 60/269,234, filed on Feb. 14, 2001.

(51) Int. Cl.[7] .............................................. H04B 17/02
(52) U.S. Cl. ...................... 455/135; 455/140; 455/63.1
(58) Field of Search ............................... 455/135, 63.1, 455/67.13, 114.2, 222, 226.3, 227.2, 283, 455/296, 436, 442, 140; 370/320, 335, 441, 370/447, 342

(56) References Cited

U.S. PATENT DOCUMENTS

| | | | | |
|---|---|---|---|---|
| 5,577,022 A | * | 11/1996 | Padovani et al. | 370/332 |
| 6,122,334 A | * | 9/2000 | Hughes | 375/350 |
| 6,266,521 B1 | * | 7/2001 | Hattori et al. | 455/312 |
| 6,377,585 B1 | * | 4/2002 | Funderburk et al. | 370/441 |
| 6,493,329 B1 | * | 12/2002 | Leung | 370/335 |
| 6,760,362 B2 | * | 7/2004 | Patel et al. | 375/147 |

FOREIGN PATENT DOCUMENTS

EP 0 431 900 A2 * 12/1991 .......... H03H 11/04

* cited by examiner

*Primary Examiner*—Sonny Trinh
(74) *Attorney, Agent, or Firm*—Harness, Dickey & Pierce, PLC

(57) ABSTRACT

A wireless communication system exposes first stage filtered energy estimates to a second stage filter whose length dynamically varies with time. With the second stage filter, it is possible to further suppress noise in low SNR conditions without affecting the overall filtering response time.

16 Claims, 5 Drawing Sheets

DYNAMIC SECOND STAGE FILTERING FOR PILOT ENERGY STRENGTH MEASUREMENTS

CROSS-REFERENCE TO RELATED APPLICATIONS

This application claims benefit of U.S. Provisional application No. 60/269,234, filed Feb. 14, 2001, the content of which is herein incorporated by reference in its entirety.

TECHNICAL FIELD

This invention relates to wireless communication systems, and more particularly to a pilot energy strength measurement process.

BACKGROUND

Cellular telephones may operate under a variety of standards including the code division multiple access (CDMA) cellular telephone communication system as described in TIA/EIA, IS-95, Mobile station-Base Station Compatibility Standard for Dual-Mode Wideband Spread Spectrum Cellular System, published July 1993. CDMA is a technique for spread-spectrum multiple-access digital communications that creates channels through the use of unique code sequences. In CDMA systems, signals can be and are received in the presence of high levels of interference. The practical limit of signal reception depends on the channel conditions, but CDMA reception in the system described in the aforementioned IS-95 Standard can take place in the presence of interference that is 18 dB larger than the signal for a static channel. Typically, the system operates with a lower level of interference and dynamic channel conditions.

A mobile station using the CDMA standard constantly searches a Pilot Channel of neighboring base stations for a pilot that is sufficiently stronger than a pilot add threshold value T_ADD. As the mobile station moves from the region covered by one base station to another, the mobile station promotes certain pilots from the Neighbor Set to the Candidate Set, and notifies the base station or base stations of the promotion from the Neighbor Set to the Candidate Set via a Pilot Strength Measurement Message. The base station determines an Active Set according to the Pilot Strength Measurement Message, and notifies the mobile station of the new Active Set via a Handoff Direction Message. The mobile station will maintain communication with both the old base station and the new base station so long as the pilots for each base station are stronger than a pilot drop threshold value T_DROP. When one of the pilots weakens to less than the pilot drop threshold value for a specified time T_TDROP, the mobile station notifies the base station of the change. The base station may then determine a new Active Set, and notify the mobile station of that new Active Set. Upon notification by the base station, the mobile station then demotes the weakened pilot to the Neighbor Set.

When the received energy of the pilot signal is near a trigger point such as T_DROP, low signal-to-noise (SNR) conditions may be present. Under low SNR conditions, noisy energy samples may cause the energy estimate to briefly exceed the threshold values such as T_DROP, in which case the timer would be inappropriately reset. Consequently, this may cause the mobile station to not request that the pilot be removed from the Active set, which may negatively impact the capacity of the wireless system.

SUMMARY

The first stage filtered energy estimates in a wireless communication system are exposed to a second stage filter whose length dynamically varies in time. Using the second stage filter, it is possible to further suppress noise in low SNR conditions, or generally, near trigger points, without affecting the overall filtering response time.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
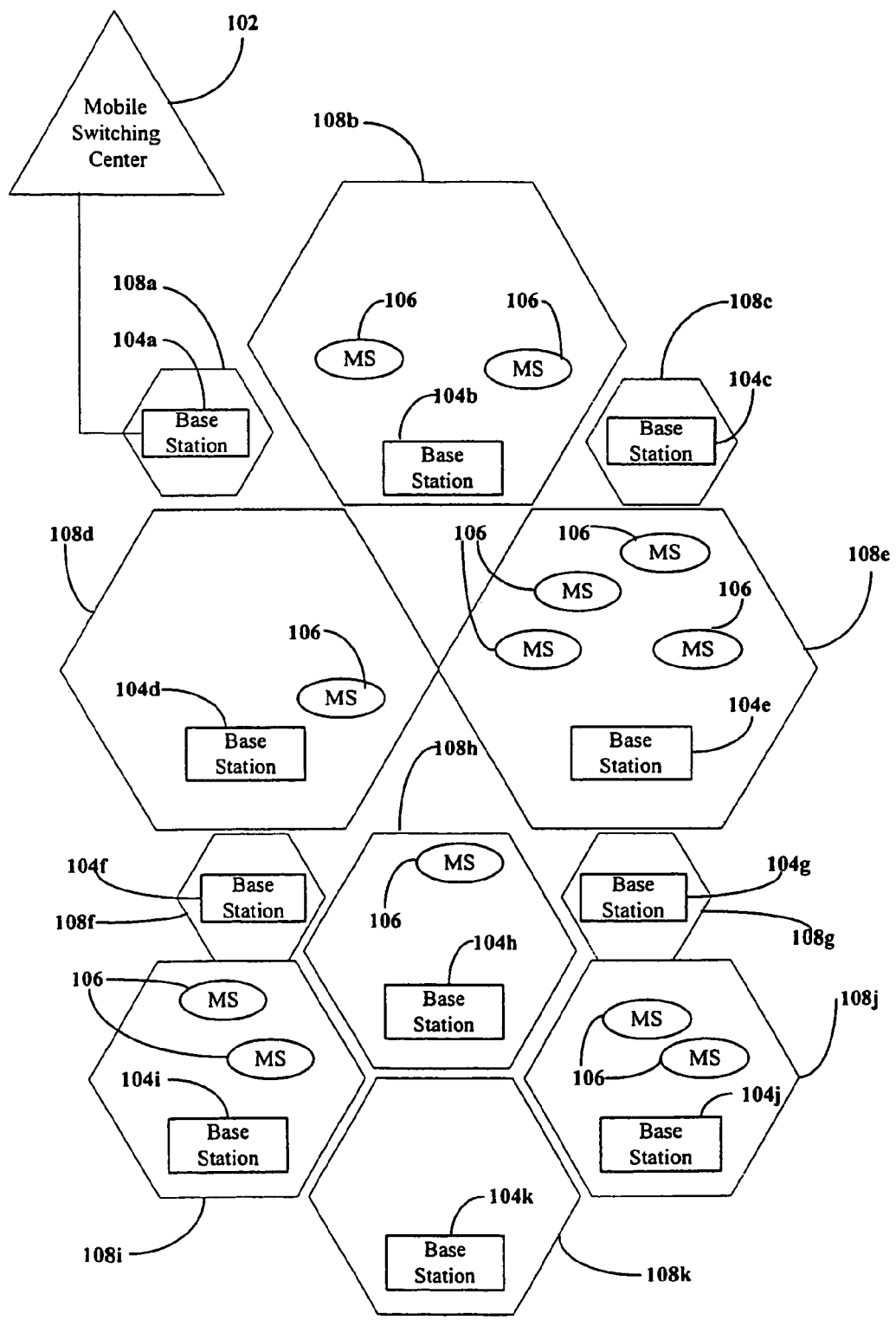
FIG. 1 is an illustration of a wireless communication system.

FIG. 1 illustrates components of an exemplary wireless communication system. A mobile switching center 102 communicates with base stations 104a–104k (only one connection shown). The base stations 104a–104k (generally 104) transmits data to and receives data from mobile stations 106 within cells 108a–108k (generally 108). A cell 108, corresponding to a geographic region, is served by a base station. Practically, said geographic regions often overlap to a limited extent.

A mobile station 106 is capable of receiving data from and transmitting data to a base station 104. In one embodiment, the mobile station 106 receives and transmits data according to a Code Division Multiple Access (CDMA) technique. CDMA is a communication technique that permits mobile users of wireless communication devices to exchange data over a telephone system, wherein radio signals carry data to and from the wireless devices. A set of standards that define a version of CDMA that is particularly suitable for use with the invention include IS-95, IS-95A, and IS-95B, Mobile Station-Base Station Compatibility Standard for Dual-Mode Spread Spectrum Systems; TIA/EIA/IS-2000-2, Physical Layer Standard for cdma2000 Spread Spectrum Systems; and TIA/EIA/IS-2000-5 Upper Layer (Layer 3) Signaling Standard for cdma2000 Spread Spectrum Systems, all of which are herein incorporated by reference in their entirety.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, continue to search for pilot channel transmissions from the base stations 104 in the cells 108 to detect pilots that are sufficiently strong with which to establish a communications link. In addition, mobile stations 106 may drop base stations 104 in which the energy level of the pilot is not sufficiently strong.

Figure 2:
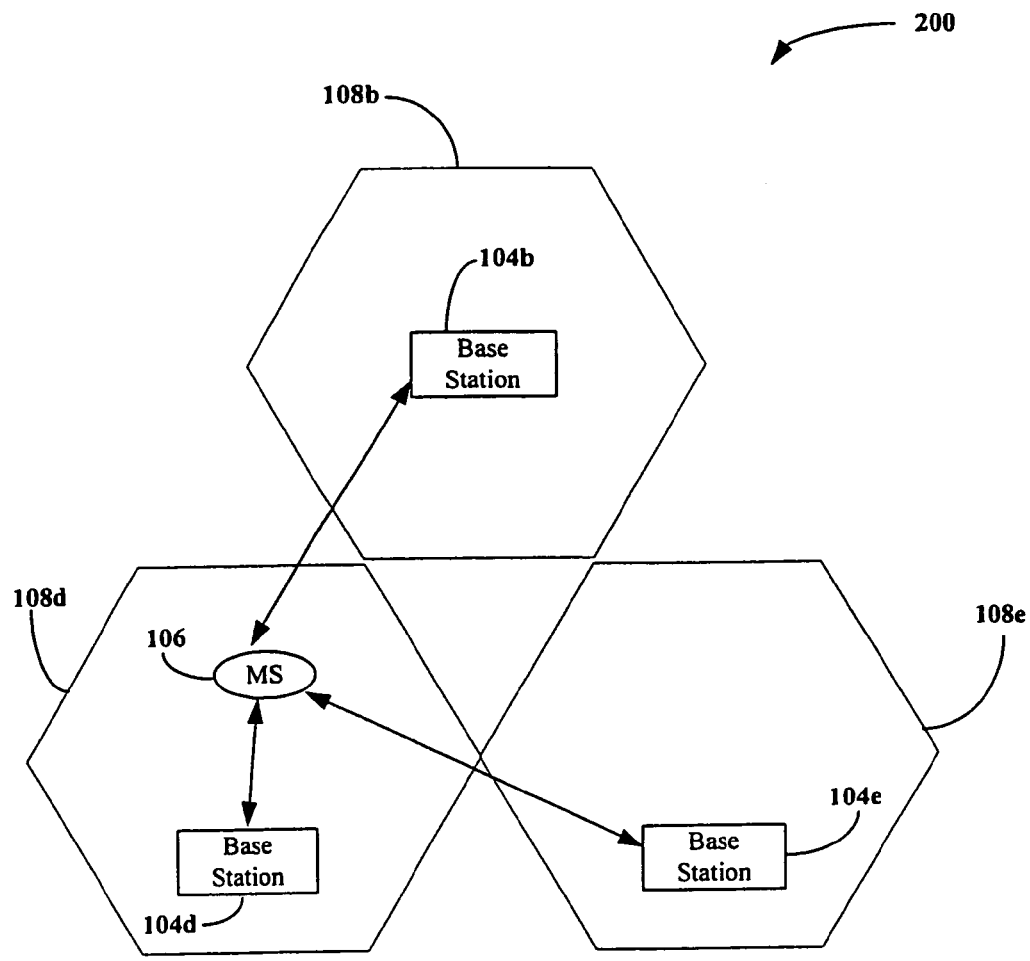
FIG. 2 is an illustration of a portion of a wireless communication system.

One example of such a mobile station 106 is a cellular telephone used by a vehicle driver who converses on the cellular telephone while driving in a cell 108*b*. Referring to FIG. 2, a portion of a wireless system is shown. The cellular telephone synchronizes communication with the base station 104*b* by monitoring a pilot that is generated by the base station 104*b*. While powered on, the mobile station 106 continues to search predetermined CDMA system frequencies for pilots from other base stations 104 such as the pilots from the base stations 104*d* and 104*e* as well as the pilot corresponding to the base station 104*b*. Upon detecting a pilot from another base station 104*d*, the mobile station 106 initiates a handoff sequence to add the pilot to the Active Set. Likewise, upon determining that the energy level of an Active Set pilot has weakened sufficiently and the handoff timeout value, T_TDROP, has been exceeded, the mobile station 106 initiates a handoff sequence to drop the pilot.

Figure 3:
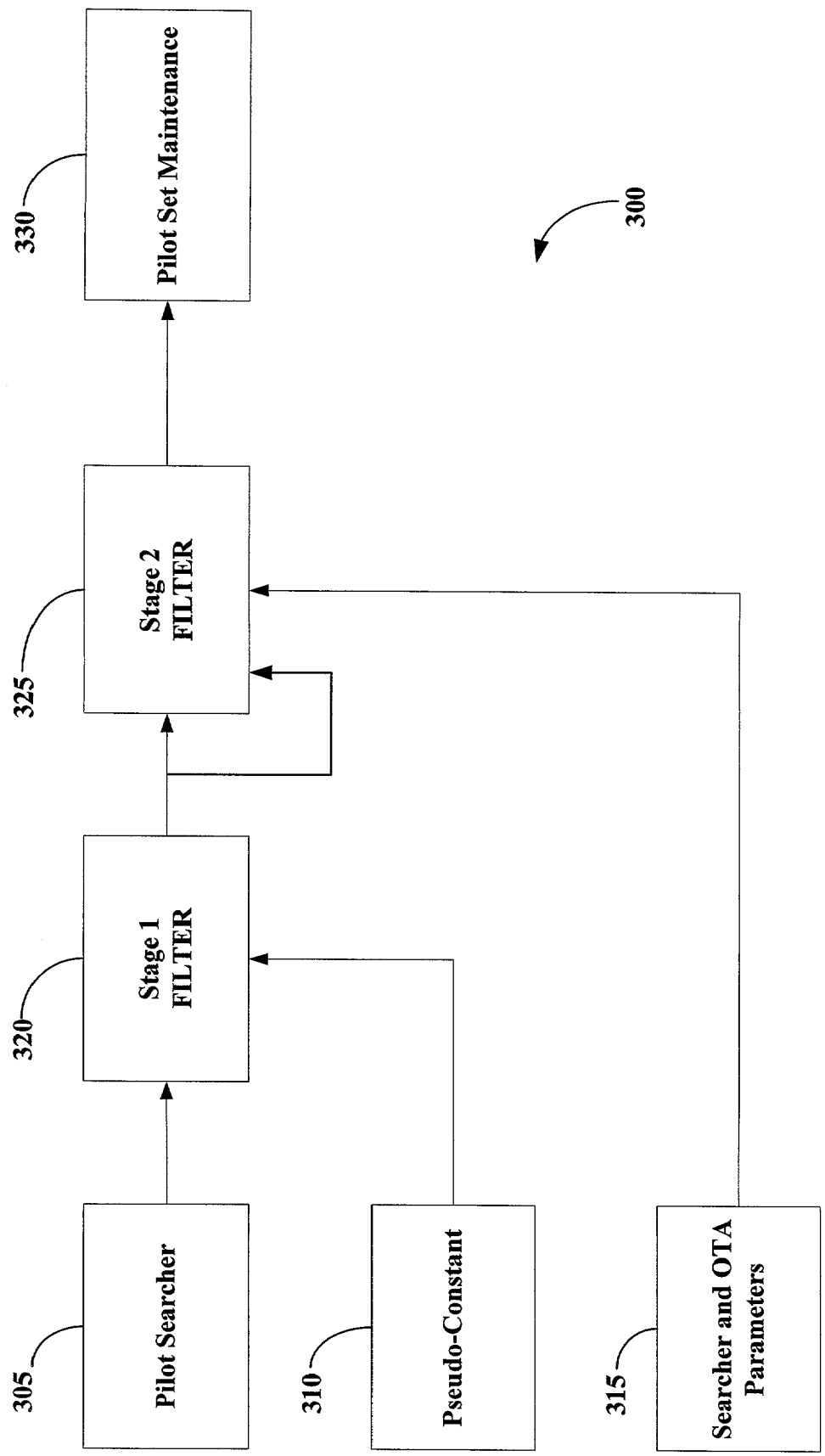
FIG. 3 is a block diagram of the pilot strength energy filters within the mobile station.

FIG. 3 shows a block diagram of a portion 300 of a mobile station including the pilot energy strength filters. A mobile station pilot searcher 305 provides raw pilot energy estimates (based on pilot signal correlation results from the CDMA demodulator elements) as an input to the first stage Infinite Impulse Response (IIR) filter 320. Typically, the filters 320 and 325 are implemented on a software platform, however they can just as easily be implemented on a firmware platform within the MSM ASIC, or as a physical hardware circuit. This first stage filter can also be defined as a Finite Impulse Response (FIR) filter, however common practice is to use an IIR type, since it is computationally efficient. The first stage IIR filter 320 also receives an input from a pseudo-constant 310. The first stage IIR filter 320 takes energy estimates from the demodulator, and filters them using a nearly constant filter length, determined by the pseudo-constant 310. The pseudo-constant's value may be adjusted to maintain the first stage IIR filter 320 consistent with time, since the time between sequential pilot signal correlation operations are not fixed. The filter length is usually relatively small (less than 25 samples), and it functions to remove receiver and demodulator noise from the energy estimates. The first stage IIR filter's time constant is not based on the individual energy estimates, and changes relatively infrequently. Additionally, this time constant is bounded to quite a limited range, such that it does not impart excessive filtering delay on the energy samples.

A second stage IIR filter 325 takes the output of the first filter as its input. The time constant of the second stage can be based on such factors as: the input energy estimates, raw pilot signal correlation results, and/or searcher or over-the-air (OTA) parameters 315. Searcher parameters may include, but are not limited to, such correlation items as: integration length, integration gain, or searcher window size. Over-the-air parameters may include, but are not limited to, such network specified items as: T_DROP, T_TDROP, or T_ADD. The length of the second stage IIR filter can be large. The second stage IIR filter stabilizes the energy estimates that are provided to the Pilot Set Maintenance function 330 specifically at PSM trigger points such as T_DROP, and provides increased isolation from signal fades, as compared to the first stage IIR filter 320, which functions to remove demodulator noise.

A dynamic time constant "C(n)" of the second stage filter 325 can be calculated using many different parameter inputs, such as T_DROP. Additionally, this time constant can include such searcher/demodulator inputs as correlation length or gain. A sample calculation for a (N−1)/N type second stage filter is as follows:

$$Y(n) = \frac{\{Y(n-1) \times \{C(n)-1\}\} + X(n)}{C(n)}$$

$$\sigma = \text{Second Stage ``Turn-On'' Range}$$

$$\alpha = \text{Coefficient Scaling Factor}$$

$$\delta(n) = (\text{T\_DROP} + \sigma) - X(n)$$

$$C(n) = \begin{cases} 1 & \text{for } \delta(n) \leq 0 \\ \alpha \times \dfrac{\delta(n)}{\sigma} & \text{for } \delta(n) > 0 \end{cases}$$

Figure 5:
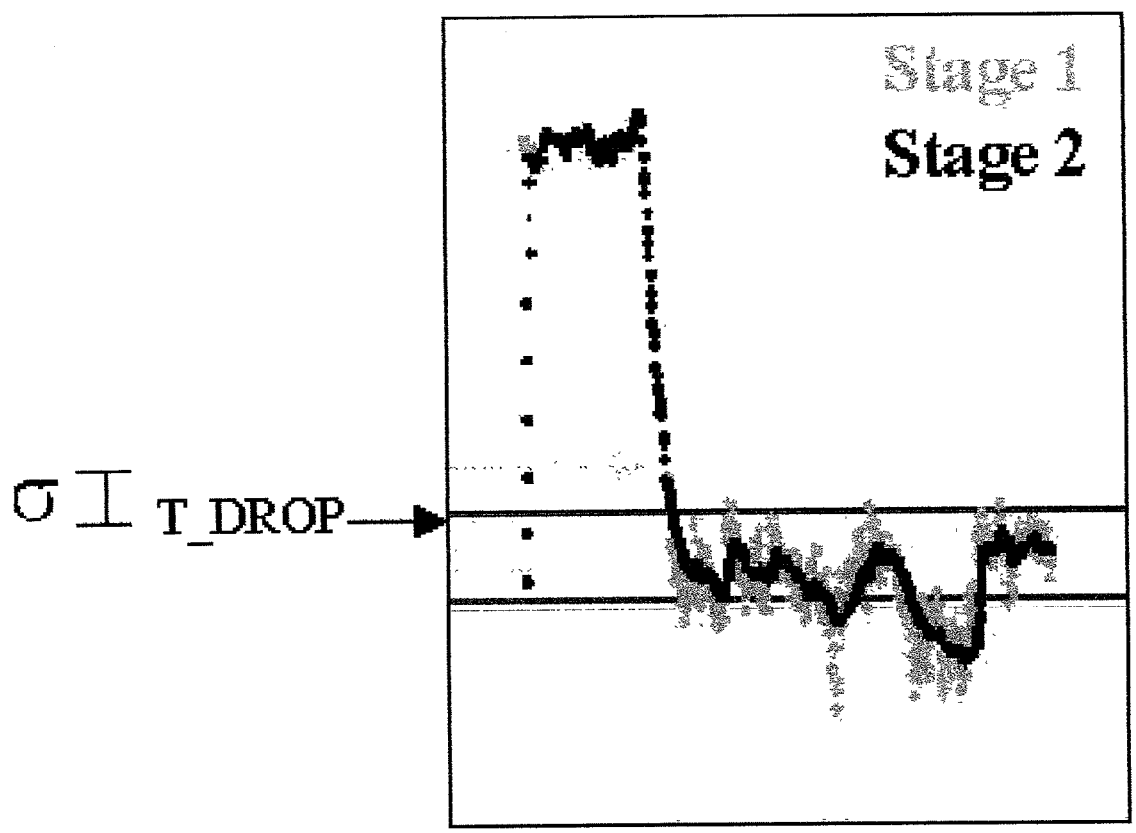
FIG. 5 is a graph depicting the threshold T_DROP and the specified upwards variance range σ.

The above example calculation shows that C(n) can be a piecewise linear function of the first stage output. Depending on the desired characteristics of the second stage filter, in a manner specified by someone skilled in the art, C(n) can also be chosen to as logarithmic, exponential, discrete, or any other type of function. The second stage IIR filter 320 is typically only "enabled" when the outputs of Stage 1 are close to a threshold value such as T_DROP (within some upward variance range, σ, which may be specified by the network, or calculated autonomously by the mobile station). FIG. 5 depicts the threshold T_DROP and the specified upwards variance range σ. Also, since the time constant of the second stage IIR filter depends on the input energy, it can instantaneously react to dynamic signal conditions. This way, if the signal intensity suddenly rises above a threshold value such as T_DROP+a variance, the filter can immediately "shut off". If the filter did not function in this manner, the Pilot Set Maintenance function 330 may be provided energy estimates weaker than the stage one filtered signal due to increased delay caused by the stage two filter.

Figure 4:
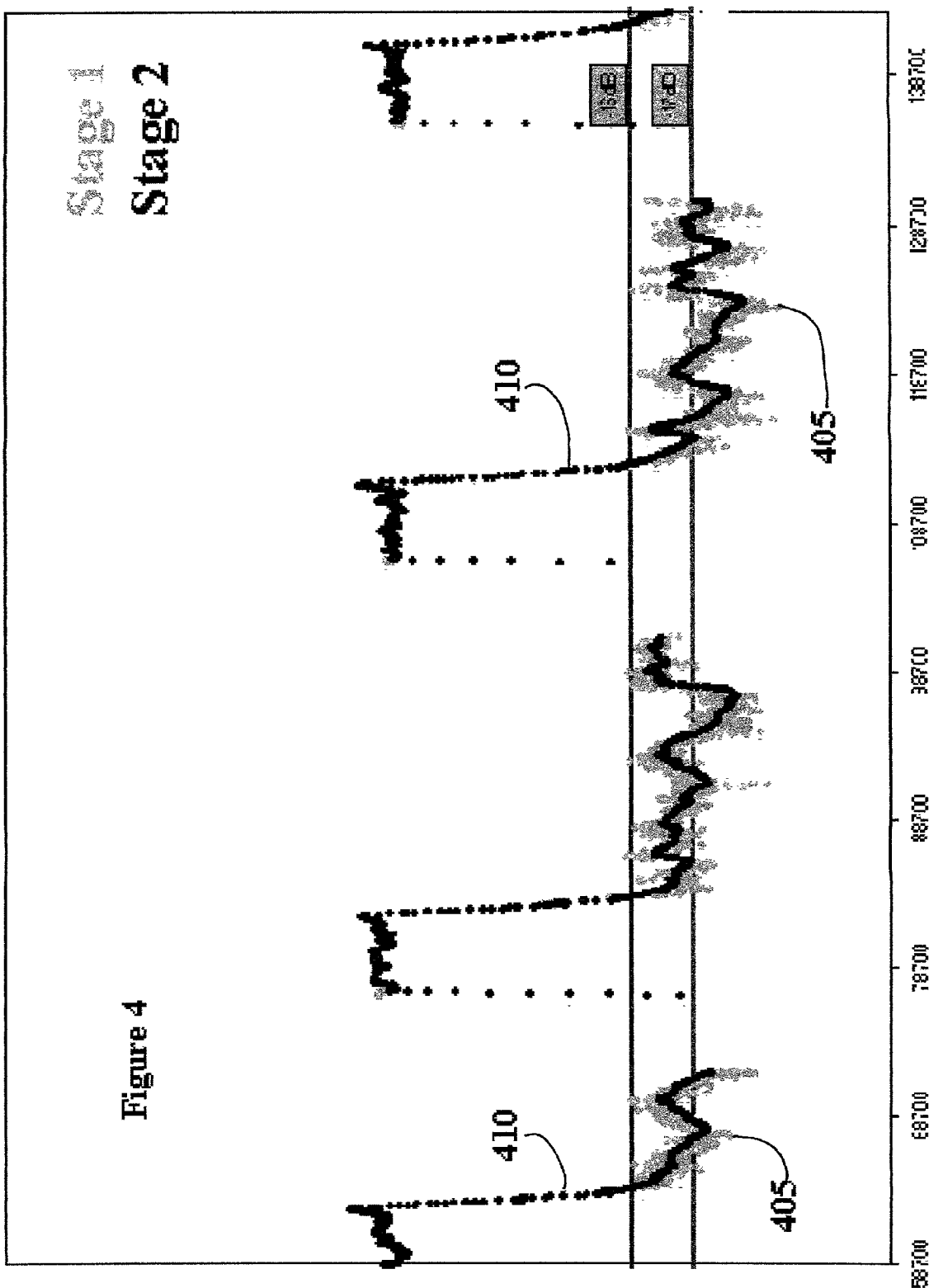
FIG. 4 is a graph illustrating the results of a simulation using the second stage filter in accordance with the principles of the invention.

FIG. 4 is a graph illustrating the results of a simulation using the second stage filter in accordance with the principles of the invention. The graph in FIG. 4 shows the received pilot energy strengths under IS-98c's Active Set Pilot Loss Detection in Soft Handoff test. T_DROP is set to −16 db. The transmitted pilot energy drops from −11 dB, past T_DROP, to −17 dB. The line 405 is the output of the common practice, single-stage IIR filter. The line 410 is the result of applying this data to a second stage IIR filter 320 whose length is calculated using inputs of: raw pilot energy correlations, first stage filtered energy estimates, and T_DROP.

Each time the line 405 exceeded −16 db (or T_DROP), the timer would have been reset. It is evident that single stage IIR filtering would not sufficiently suppress noise at this energy level, and each of these three test instances above would have failed. It is also clear that by using an additional second stage filter 320 (line 410), noise would have been sufficiently suppressed and the mobile station 106 would have passed each test instance. Notice also, that because a second stage filter 320 is used (versus extending the time constant of the first stage), there is no significant effect on filter delay. This is exhibited by observing that when the output value of the first stage filter 405 is larger than the "turn-on" range of the second filter 325, the output value of the second stage filter 410 quickly replicates the output of the first stage filter 405.

A number of embodiments of the invention have been described. Nevertheless, it will be understood that various modifications may be made without departing from the spirit and scope of the invention. Accordingly, other embodiments are within the scope of the following claims.

What is claimed is:

1. A method of filtering a signal in a wireless communication system comprising:
   providing a signal to a first filter to generate a filtered output;
   comparing the filtered output to a threshold value;
   activating a second filter when the filtered output is within a predetermined range of the threshold; and
   providing the output of the second filter to a pilot set maintenance function.

2. The method of claim 1, further comprising providing a nearly constant filter length of the first filter.

3. The method of claim 1, further comprising removing demodulator noise with the first filter.

4. The method of claim 1, further comprising setting a time constant of the second filter based on input energy estimates.

5. The method of claim 1, further comprising setting a time constant of the second filter based on searcher or over-the-air parameters.

6. The method of claim 1, further comprising setting a dynamic time constant for the second filter.

7. The method of claim 6, further comprising setting the dynamic time constant of the second filter based on input energy estimates.

8. The method of claim 6, further comprising setting the dynamic time constant of the second filter based on searcher or over-the-air parameters.

9. The method of claim 1, further comprising bypassing the second filter when the filtered output is beyond the predetermined range of the threshold value.

10. A mobile station for use in a wireless communication system comprising a first filter which receives a signal and a second filter, wherein an output of the first signal is filtered by the second filter when the output of the first filter is within a range of a threshold value;
    wherein the output of the second filter is provided to a pilot set maintenance function.

11. The mobile station of claim 10, wherein the first filter receives energy values from a demodulator.

12. The mobile station of claim 11, wherein the first filter removes demodulator noise from the energy values.

13. The mobile station of claim 10, wherein the first filter has a small, nearly constant filter length.

14. The mobile station of claim 10, wherein the second filter has a dynamic time constant based on the input energy values.

15. The mobile station of claim 10, wherein the second filter has a dynamic time constant based on searcher or over-the-air parameters.

16. The mobile station of claim 10, wherein the second filter is bypassed if the output of the first filter is outside the range of the threshold value.

* * * * *